(12) United States Patent
Zhao et al.

(10) Patent No.: US 11,002,652 B2
(45) Date of Patent: May 11, 2021

(54) APPARATUS TO MEASURE MECHANICAL PROPERTIES OF ELECTRODES DURING ELECTROCHEMICAL REACTIONS AND METHOD OF USING THE SAME

(71) Applicant: Purdue Research Foundation, West Lafayette, IN (US)

(72) Inventors: Kejie Zhao, West Lafayette, IN (US); Luize Scalco de Vasconcelos, West Lafayette, IN (US); Rong Xu, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 151 days.

(21) Appl. No.: 16/240,014

(22) Filed: Jan. 4, 2019

(65) Prior Publication Data

US 2019/0204194 A1 Jul. 4, 2019

Related U.S. Application Data

(60) Provisional application No. 62/613,698, filed on Jan. 4, 2018.

(51) Int. Cl.
*G01N 3/42* (2006.01)
*G01N 27/49* (2006.01)
*B82Y 35/00* (2011.01)

(52) U.S. Cl.
CPC .............. *G01N 3/42* (2013.01); *G01N 27/49* (2013.01); *B82Y 35/00* (2013.01); *G01N 2203/0286* (2013.01)

(58) Field of Classification Search
CPC .. G01N 3/42; G01N 2203/0286; G01N 27/49; G01N 27/4045; G01N 21/66; B82Y 35/00; H01M 8/188; H01M 12/08
USPC .......................................................... 73/81
See application file for complete search history.

(56) References Cited

U.S. PATENT DOCUMENTS

| | | | | |
|---|---|---|---|---|
| 8,310,130 B2 * | 11/2012 | Chiang | ................... | F03G 7/005 310/311 |
| 10,876,992 B2 * | 12/2020 | Hansen | ................ | G01N 27/404 |
| 2001/0021472 A1 * | 9/2001 | Barker | ................ | H01M 4/5825 429/231.95 |
| 2003/0060987 A1 * | 3/2003 | Dao | ........................ | G01N 3/42 702/42 |

(Continued)

*Primary Examiner* — Octavia Hollington
(74) *Attorney, Agent, or Firm* — Hartman Global IP Law; Gary M. Hartman; Domenica N. S. Hartman (57) ABSTRACT

Methods and apparatuses for measuring mechanical properties of electrodes during electrochemical reactions. Such an apparatus includes a fixture having a fluid reservoir that is open to a surrounding atmosphere, first and second electrodes located within the fluid reservoir, and a contact for coupling with a sample material located in the fluid reservoir to define a third electrode. The apparatus further includes a nanoindenter configured for applying a load to a surface of the sample material to form an indentation therein and measuring the load and the size of the indentation over time, a housing enclosing the fixture and the nanoindenter within an inert atmosphere, and a potentiostat configured to charge and discharge an electrochemical cell that is defined by the first, second, and third electrodes and an electrolyte solution in the fluid reservoir while the nanoindenter is applying the load.

20 Claims, 12 Drawing Sheets

(56) References Cited

U.S. PATENT DOCUMENTS

| | | | |
|---|---|---|---|
| 2009/0280413 A1* | 11/2009 | Ohta | H01M 4/133 |
| | | | 429/231.8 |
| 2015/0125752 A1* | 5/2015 | Nishimura | H01M 10/0525 |
| | | | 429/231.4 |
| 2015/0241382 A1* | 8/2015 | Mett | G01N 27/4045 |
| | | | 205/780.5 |
| 2016/0073920 A1* | 3/2016 | Kassegne | A61B 5/04001 |
| | | | 600/395 |
| 2016/0084740 A1* | 3/2016 | Beaudoin | G01N 33/227 |
| | | | 15/209.1 |
| 2019/0103600 A1* | 4/2019 | Greer | H01M 4/1393 |

* cited by examiner

APPARATUS TO MEASURE MECHANICAL PROPERTIES OF ELECTRODES DURING ELECTROCHEMICAL REACTIONS AND METHOD OF USING THE SAME

CROSS REFERENCE TO RELATED APPLICATIONS

This application claims the benefit of U.S. Provisional Application No. 62/613,698, filed Jan. 4, 2018, the contents of which are incorporated herein by reference.

STATEMENT REGARDING FEDERALLY SPONSORED RESEARCH

This invention was made with government support under CMMI-1726392 awarded by the National Science Foundation. The government has certain rights in the invention.

BACKGROUND OF THE INVENTION

The present invention generally relates to material testing for electrochemical fluid cells. The invention particularly relates to apparatuses, methods, and devices for measuring mechanical properties of electrodes within electrochemical fluid cells during the operation thereof.

Mechanics and electrochemistry are intimately coupled in energy technologies such as batteries, fuel cells, supercapacitors, photovoltaics, and hydrogen storage. Electrochemical reactions between a host material and guest species induce deformation, stress, fracture, and fatigue which cause ohmic and thermal resistance increase and performance degradation. Likewise, mechanical stresses regulate mass transport, charge transfer, interfacial reactions, and consequently the potential and capacity of electrochemical systems. In batteries, mechanical degradation compromises the performance of current technologies and limits the implementation of high-capacity electrodes. Mechanics of both anode and cathode materials, such as diffusion-induced stresses, large deformation, plasticity, and fracture, have been extensively studied in recent years. Nevertheless, the intimate coupling between mechanics and electrochemistry is far from being completely understood.

One deficiency is a lack of reliable experimental tools to characterize the mechanical behaviors of electrodes under real electrochemical conditions. The operation of batteries is extremely sensitive to the work environment, for example, a trace of oxygen and moisture can cause numerous side reactions. In contrast, most mechanical test equipment includes an open system with limited capability of environment control. As such, the mechanics and electrochemistry of batteries are often characterized separately. Recent studies propose that the mechanical response of materials at the chemical equilibrium states may differ from that under concurrent mechanical and chemical loads. As such, there is a need for an experimental platform to probe the chemomechanical behaviors of electrodes in the course of electrochemical reactions.

BRIEF DESCRIPTION OF THE INVENTION

The present invention provides methods and apparatuses suitable for measuring mechanical properties of electrodes during electrochemical reactions within a controlled environment.

According to one aspect of the invention, an apparatus is provided for performing indentation on an electrode in an electrochemical cell during operation thereof. The apparatus includes a fixture comprising a fluid reservoir that is open to a surrounding atmosphere, first and second electrodes located within the fluid reservoir, and a contact for coupling with a sample material located in the fluid reservoir to define a third electrode. The apparatus further includes a nanoindenter configured for applying a load to a surface of the sample material to form an indentation therein and measuring the load and size of the indentation over time, a housing enclosing the fixture and the nanoindenter within an inert atmosphere, and a potentiostat configured to charge and discharge an electrochemical cell that is defined by the first, second, and third electrodes and an electrolyte solution in the fluid reservoir while the nanoindenter is applying the load.

According to another aspect of the invention, a method is provided for performing indentation on an electrode in an electrochemical cell during operation thereof. A sample material is located in a fluid reservoir of a fixture. The fluid reservoir includes first and second electrodes located therein and is open to a surrounding atmosphere. The sample material is coupled to a contact on the fixture to define a third electrode. The fluid reservoir is filled with an electrolyte solution to submerge the first, second, and third electrodes. An electrochemical cell defined by the first, second, and third electrodes and the electrolyte solution is charged and/or discharged while an indentation is formed in a surface of the sample material by applying a load thereto with a nanoindenter and, simultaneously, the load and size of the indentation are measured over time. The fixture and nanoindenter are enclosed within a housing filled with an inert atmosphere.

Technical effects of the method and apparatus as described above preferably include the ability to reliably measure mechanical properties of electrodes during electrochemical reactions.

Other aspects and advantages of this invention will be appreciated from the following detailed description.

DETAILED DESCRIPTION OF THE INVENTION

Figure 1:
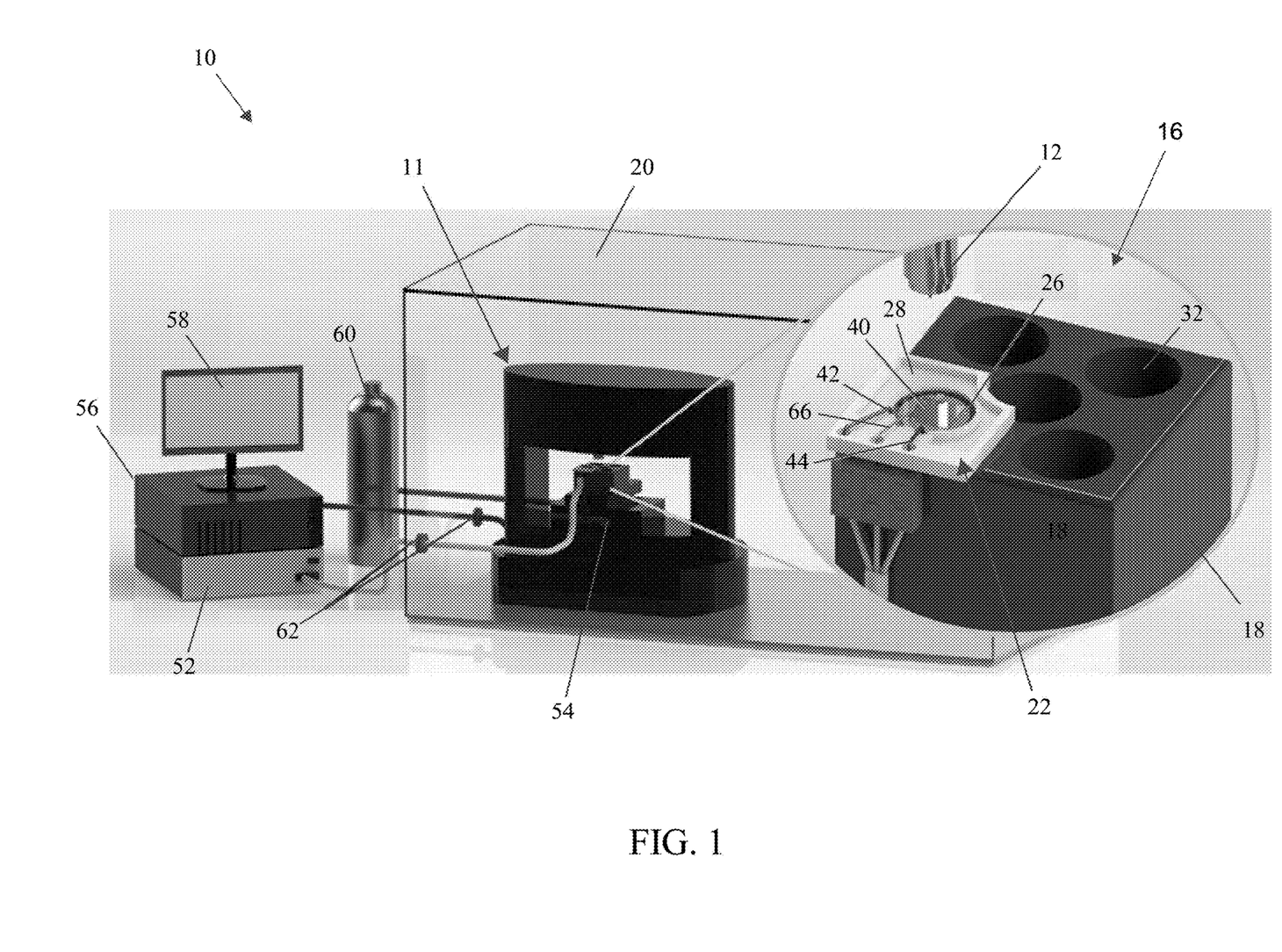
FIG. 1 represents an apparatus for operando indentation testing of electrodes in accordance with certain nonlimiting aspects of the invention. The apparatus includes a nanoindenter residing in an inert gas-filled glovebox, a fixture for a liquid cell, and an electrochemical station (potentiostat).

FIG. 1 represents a nonlimiting apparatus 10 configured to measure mechanical properties of electrodes during electrochemical reactions. To facilitate the description provided below of the embodiments represented in the drawings, relative terms, including but not limited to, "vertical," "horizontal," "lateral," "front," "rear," "side," "forward," "rearward," "upper," "lower," "above," "below," "right," "left," etc., may be used in reference to the orientation of the apparatus 10 as represented in FIG. 1, and therefore are relative terms that are useful to describe installations of the apparatus 10 represented in the drawings, but should not be necessarily interpreted as limiting the scope of the invention.

The apparatus 10 represented in FIG. 1 is adapted to perform nanoindentation on an electrode during operation of a fluid cell environment. Nanoindentation is a well-established technique to measure a variety of mechanical properties of materials at local positions. Nanoindentation requires careful control of the stability of the surrounding environment, the size, properties, and surface condition of the sample, and the tip size and geometry of the indenter (nanoindenter). To perform nanoindentation on an electrode during the operation of a fluid cell, additional challenges are associated with probing the electrode while submerged in a fluid cell environment. When it comes to operando indentation in the course of electrochemical reactions, specific challenges, such as the volumetric change of electrodes during indentation, the substrate effect, structural degradation of the electrodes, and the interference of SEI must be also addressed.

Figure 2:
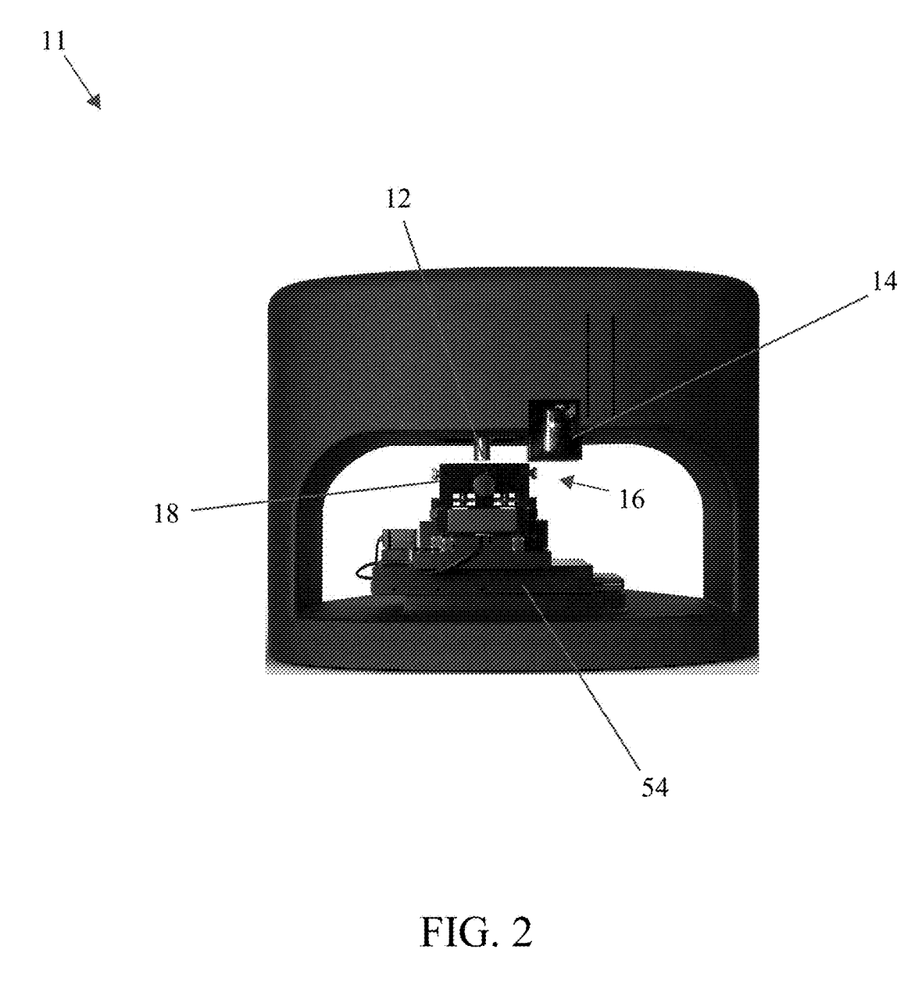
FIG. 2 represents a side view of the nanoindenter of FIG. 1.
Figure 4:
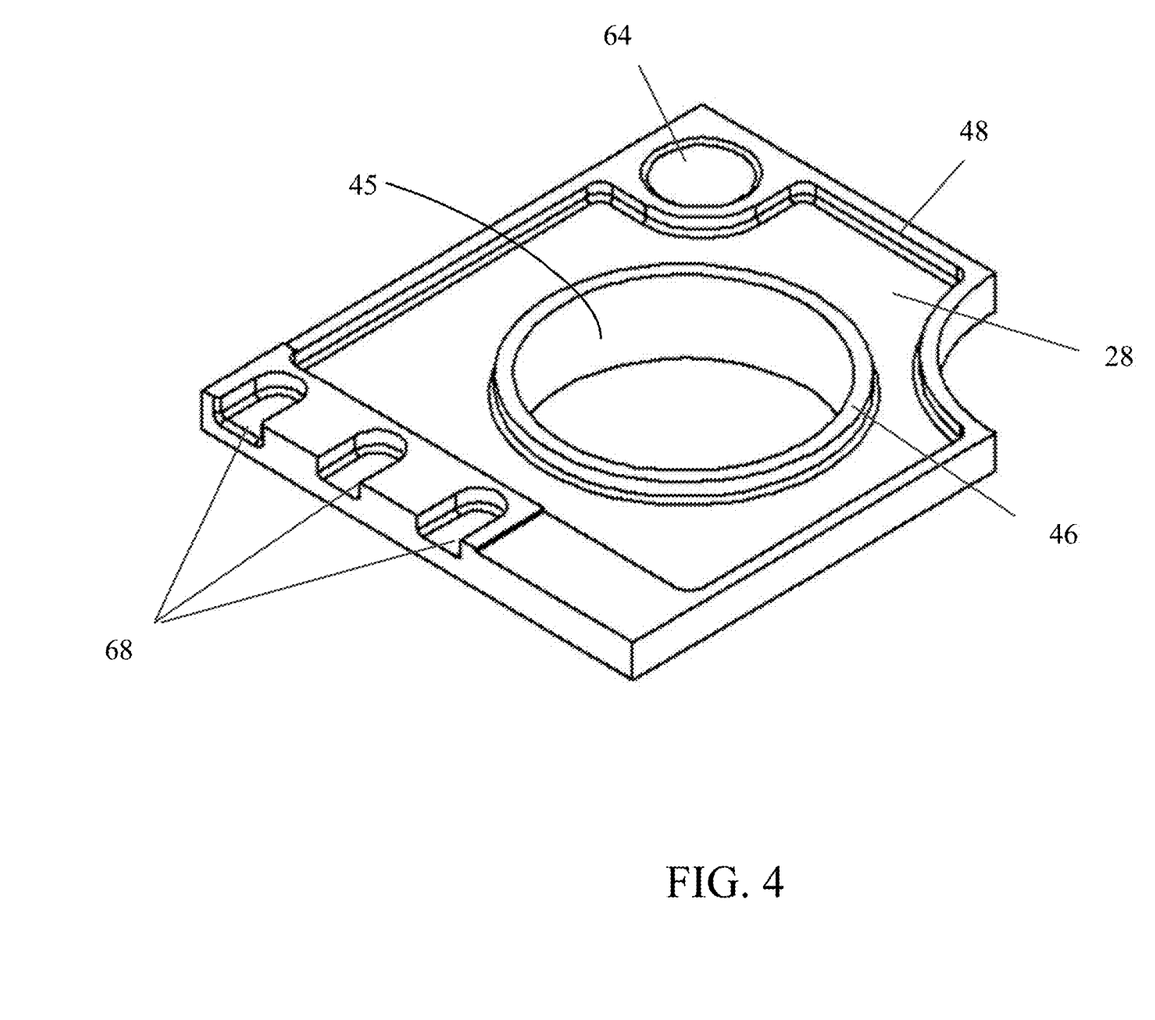
FIG. 4 represents an isolated view of a tray of the fixture of FIG. 3.
Figure 5:
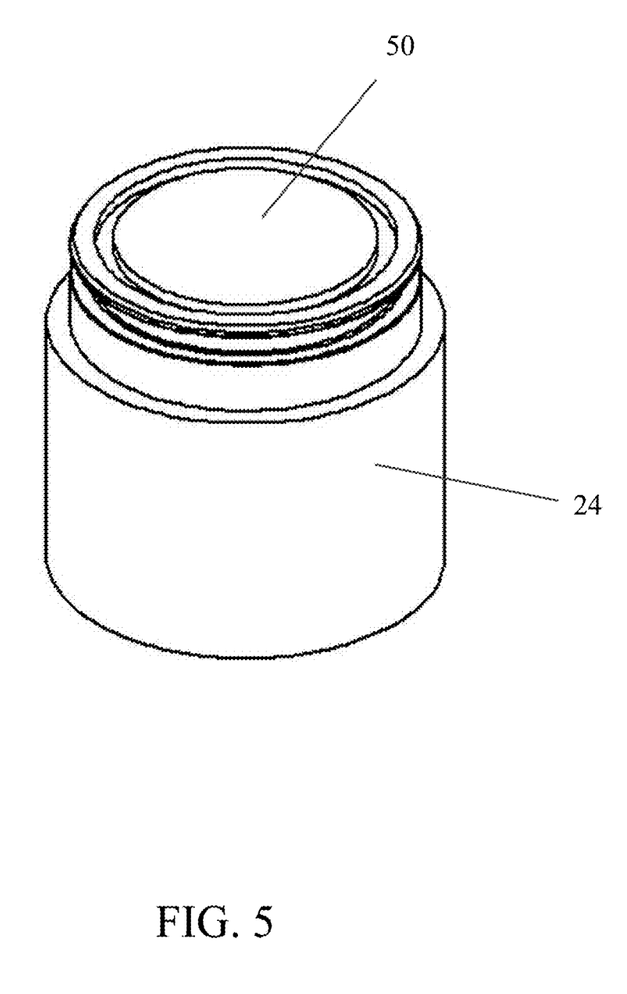
FIG. 5 represents an isolated view of a holder of the fixture of FIG. 3.
Figure 6:
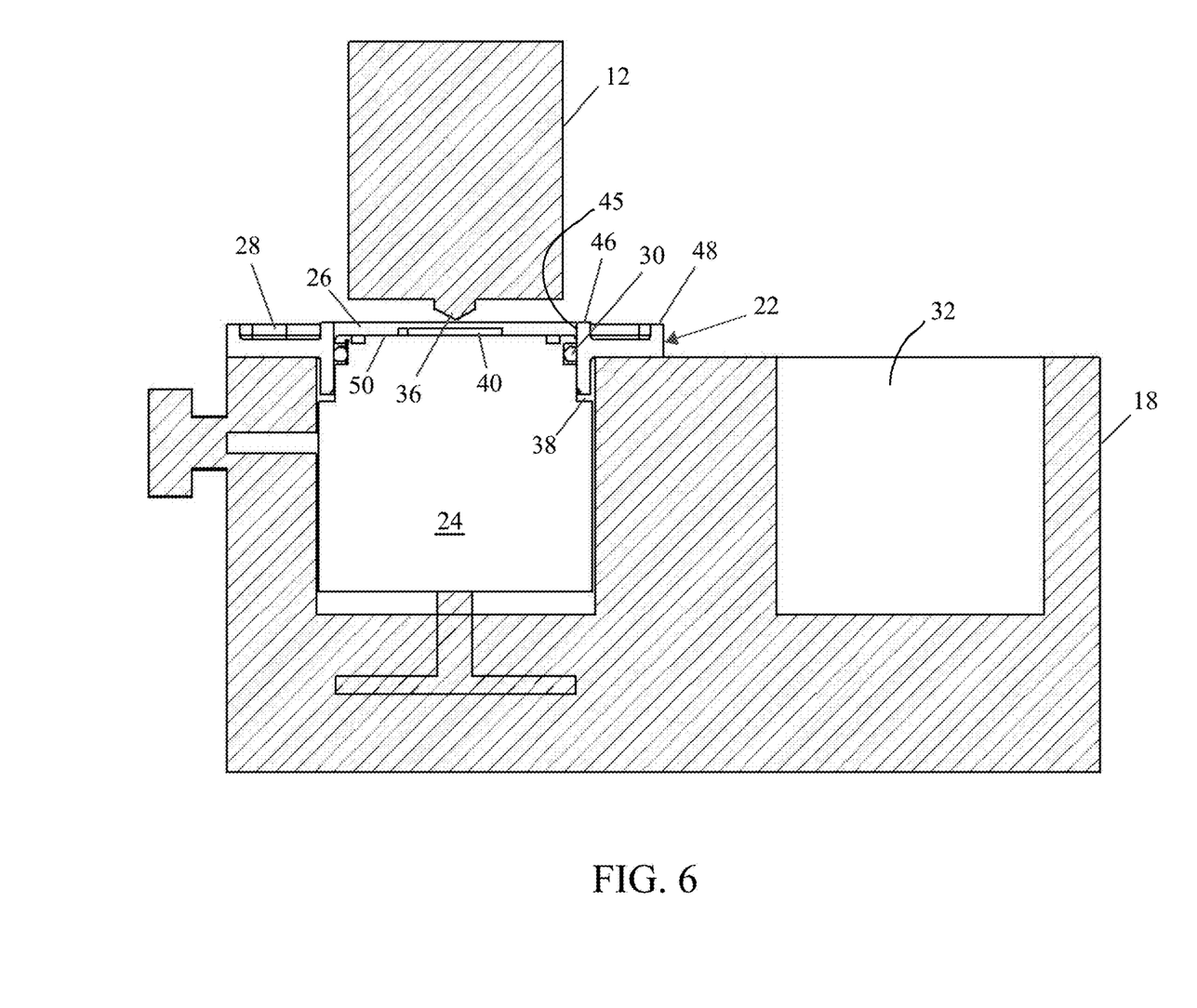
FIG. 6 represents a cross-sectional side view of the fixture of FIG. 1.

The apparatus 10 represented in FIG. 1 includes a nanoindenter unit 11 (shown in isolation in FIG. 2) equipped with an nanoindenter 12, an optical microscope 14 (FIG. 2), and a fluid cell 16 all enclosed within an argon-filled housing (glovebox) 20 within which oxygen and water concentrations are preferably controlled below 0.5 ppm. The fluid cell 16 includes a fixture comprising a tray 22 supported on a modular specimen holder 24 (FIGS. 5 and 6). The tray 22 includes a hole 45 therethrough with an inner wall 46 (FIGS. 4 and 6) around the perimeter of the hole. As seen in FIG. 6, an uppermost portion of the holder 24 is configured to be received within the hole 45 of the tray 22 from below and a liquid seal is provided therebetween, for example, with an o-ring 30. As an alternative embodiment, the tray 22 and the holder 24 could be a single component.

Both the tray 22 and holder 24 are configured to couple with a stage 18. In this embodiment, the stage 18 includes multiple cylindrical cavities 32 into which the tray 22 and holder 24 can be received. However, the stage 18 could have other structural configurations and the tray 22 and holder 24 could be modified to couple therewith. The stage 18 may be configured to simultaneously couple with any number of trays 22 and holders 24. Preferably, once coupled with the stage 18, the tray 22 remains in a fixed position whereas the uppermost surface 50 of the holder 24 is capable of movement relative to the stage 18 and/or tray 22 while maintaining the seal between the holder 24 and tray 22. For example, FIG. 6 represents a gap 38 between the tray 22 and holder 24 which allows for relative movement therebetween, for example, by using controls on the stage 18 to cause the holder 24 to move up or down in a vertical direction within the cavity 32.

Once the tray 22 and holder 24 are coupled with the stage 18, the tray 22 and holder 24 define a fluid reservoir 26 within the hole 45 so as to be above an uppermost surface 50 of the holder 24 and surrounded by the inner wall 46 of the tray 22. A sample to be tested may be located on the uppermost surface 50 of the holder 24 and a liquid electrolyte solution may be added to the fluid reservoir 26 to submerge the sample in the electrolyte. An overflow reservoir 28 with an outer wall 48 around the perimeter thereof surrounds the fluid reservoir 26 to reduce the likelihood of spillage during use.

Figure 3:
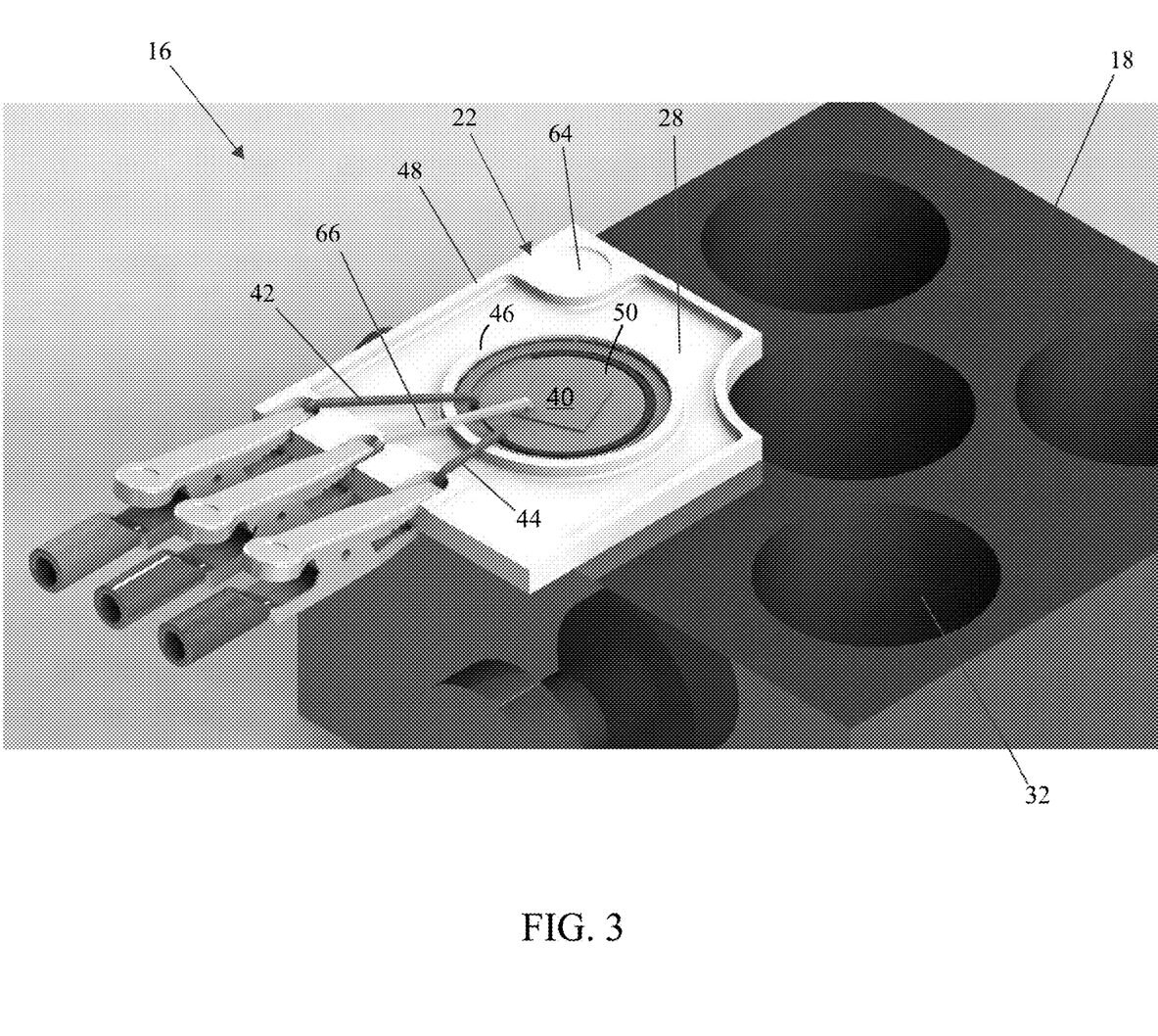
FIG. 3 represents a perspective view of a sample located in a nonlimiting fixture for use with the apparatus of FIG. 1.

The tray 22 includes or may be coupled with a reference electrode 42, a counter electrode 44 that wraps around the perimeter of the fluid reservoir 26, and a contact 66 used to connect to the sample being tested such that the sample may serve as a working electrode 40. In the embodiments represented in the drawings, portions of the reference electrode 42 and the counter electrode 44 located within the fluid reservoir 26 are in a channel surrounding the uppermost surface 50. With this configuration, the reference electrode 42 and the counter electrode 44 should not interfere with indentation of the sample. As depicted in FIG. 1, the three electrodes 40, 42, and 44 can be electrically connected to a potentiostat 52 configured to charge and discharge the fluid cell 16. In FIGS. 3 and 4, the tray 22 additionally includes recessed areas 68 to which clips may be mounted for coupling and decoupling wires from the potentiostat 52 to the electrodes 40, 42, and 44. This embodiment of the tray 22 includes a tip cleaning reservoir 64 that may be filled with a tip cleaning solution. The height of inner wall 46 of the tray 22 shown in FIGS. 1, 3, 4, and 6 is sufficiently high above the uppermost surface 50 of the holder 24 in order to maintain sufficient electrolyte to fully submerge the electrodes 40, 42, and 44, but the overall height of the tray 22 above the stage 18 should be low enough to avoid contact between the tray 22 and the tip 36 of the nanoindenter 12 (FIG. 6) and a lens of the microscope 14 during the transition of the sample between the nanoindenter 12 and microscope 14.

The stage 18 is located on a motion system 54 configured to move the stage 18 relative to a tip 36 of the nanoindenter 12 and the lens of the microscope 14 (e.g., x-y directions). Alternatively, the nanoindenter 12 and microscope 14 may be configured to move while the stage 18 remains in a fixed position. Motorized motion systems for nanoindenters, microscopes, and the like are well known in the art and therefore the components and operation thereof will not be discussed in detail herein. As represented in FIG. 1, the motion system 54, nanoindenter 12, microscope 14, and the potentiostat 52 are controlled by a controller 56 which may include a display 58. Preferably, the housing 20 includes vacuum-sealed feedthroughs 62 such that the controller 56 and potentiostat 52 may be electrically connected to components within the housing 20 without interfering with the environment therein. As represented in FIG. 1, the apparatus 10 may utilize argon or another inert or nonoxidizing gas from a suitable gas source 60 to create an inert or otherwise nonoxidizing environment within the interior of the housing 20.

The components of the fluid cell 16 may be formed of various materials depending on the type of system to be tested. For example, for testing of lithium-ion battery systems, the reference and counter electrodes 42 and 44 may be formed of lithium (Li) metal. Initial investigations indicated that relatively volatile solvents such as diethyl carbonate (DEC) resulted in significant noise and variation in experimental results. Therefore, the electrolyte is preferably a nonvolatile fluid such as $LiPF_6$ in propylene carbonate (PC), which was observed during investigations as providing a constant fluid level and salt concentration during relatively long experiments. The tray 22 and holder 24 are preferably formed of materials that are chemically inert to the electrolyte, such as polytetrafluoroethylene (PTFE).

During use of the apparatus 10, indentation tests may be performed on a sample submerged in the electrolyte solution within the fluid reservoir 26 as the fluid cell 16 is charged or discharged. In general, a user may visualize the sample surface with the microscope 14 in order to select a location for indentation testing. The stage 18 may then be moved to position the nanoindenter 12 over the selected location. The tip 36 of the nanoindenter 12 may then be extended downward such that it penetrates the sample while the fluid cell 16 is charged or discharged. Data collected during the testing may be used to evaluate various factors including but not limited to influences of the inert environment, electrolyte solution, structural degradation and volumetric change of the electrodes 40, 42, and 44, and the effects of a solid electrolyte interface (SEI) layer and the sample substrate. As such, the apparatus 10 may be used to obtain mechanical measurements of a sample not only in situ, but also during battery operation under various charging rates.

Nonlimiting embodiments of the invention will now be described in reference to experimental investigations leading up to the invention. The investigations were performed using a nanoindenter produced by KLA-Tencor Corporation and commercially available under the name Nano Indenter® G200, which was equipped with a continuous stiffness measurement (CSM) system, and a potentiostat produced by Princeton Applied Research under the trademark VersaS-TAT® 3. The reference and counter electrodes were formed of lithium metal, and the samples were submerged in an electrolyte solution of 1M $LiPF_6$-PC with a layer of approximately 800 micrometers over the sample's surface.

Initial investigations were performed to validate the working conditions of apparatus 10. The elastic modulus of fused silica ($SiO_2$) and amorphous silicon (a-Si) samples were measured to compare ambient air versus an argon environment, a standard holder versus the fluid cell 16 without electrolyte solution (i.e., dry), and dry versus wet samples (i.e., submerged in the electrolyte-filled fluid cell 16). The different measurements showed relatively close values in the various configurations. The consistent results indicated that the effects of the dielectric constant of argon on the capacitance gauge of nanoindentation, the non-standard fluid cell 16, and the buoyance and surface tension of the liquid electrolyte were negligible.

Additional investigations were performed on high-purity Li metal ribbons (99.9%, 0.75 mm thick) and a-Si thin films. The a-Si thin films were prepared with an electron-beam evaporator by deposition of a 50 nm titanium (Ti) thin film onto a one millimeter thick silica substrate, followed by the deposition of a 300 nm copper (Cu) film, both at a rate of 0.5 Å/s. The Cu film served as the current collector, and the Ti underlayer was used to improve the adhesion between the Cu film and the silica substrate. Finally, a 500 nm Si film was deposited at the same rate of 0.5 Å/s. In addition, other samples of 1.4 µm-thick silicon films were fabricated for the evaluation of the substrate effect in indentation measurements. The fabrication of the thicker Si films followed the same procedure, except that the deposition rate was 1.5 Å/s.

Nanoindentation was performed on the sample electrodes while undergoing electrochemical reactions. Tests were conducted uninterruptedly with a grid spacing of 40 µm between indents. Separate, ex-situ measurements (thirty-three indents for one indentation depth) were performed on the Li metal ribbon samples with a standard holder. The continuous stiffness measurement (CSM) method was used for hardness and modulus measurements. Tests followed a typical chronology wherein the nanoindenter approached the sample until the surface was detected (detection criteria: contact stiffness S>200 N/m), load was applied at a constant strain rate ($0.05\ s^{-1}$), the maximum load was held for a dwell time (10 s), the load was partially withdrawn and then held at a constant load for a second dwell time (60 s) to measure the drift-rate, and finally the load was completely withdrawn from the sample.

A constant-load hold method (CLH) was used for creep measurements, for which both the dynamic (CSM) and quasi-static (QS) instrumented nanoindentation were employed. For both tests, the tip of the nanoindenter was loaded until a maximum indentation depth was reached (100 nm for Si thin film and 3 µm for Li metal), and the load was maintained constant for a period of hold time while the tip displacement was measured.

Galvanostatic lithiation was employed for operando indentation. Continuous measurements of elastic modulus, hardness, and creep stress exponents were performed during the first galvanostatic discharge (cut-off voltage of 0.01 V vs Li/Li+) of Si. Elastic modulus and hardness were measured at intermediate lithiation rates (C/10.6 and C/2.9) while creep stress exponent experiments were conducted at slow discharge rates (C/30 and C/20). Titration experiments in which the galvanostatic discharge and open circuit were alternated were also performed. In addition, electrochemical cycling was employed to evaluate the relation between the drift-rate and the applied current at high C-rates (C/1.5 and C/3.3).

Lithium concentration was calculated from the state of charge of lithiated silicon (assuming a lithiation capacity of 3579 mAh/g for Si). This estimation assumed a homogeneous distribution of lithium throughout the sample. It was noted that the local lithium concentration near the nanoindenter tip may deviate from the nominal concentration as the stress field may alter the chemical potential of lithium. The inhomogeneity of lithium distribution near the nanoindenter tip depended on the lithium diffusion rate, the indentation time, and creep properties of lithiated silicon.

Figure 7:
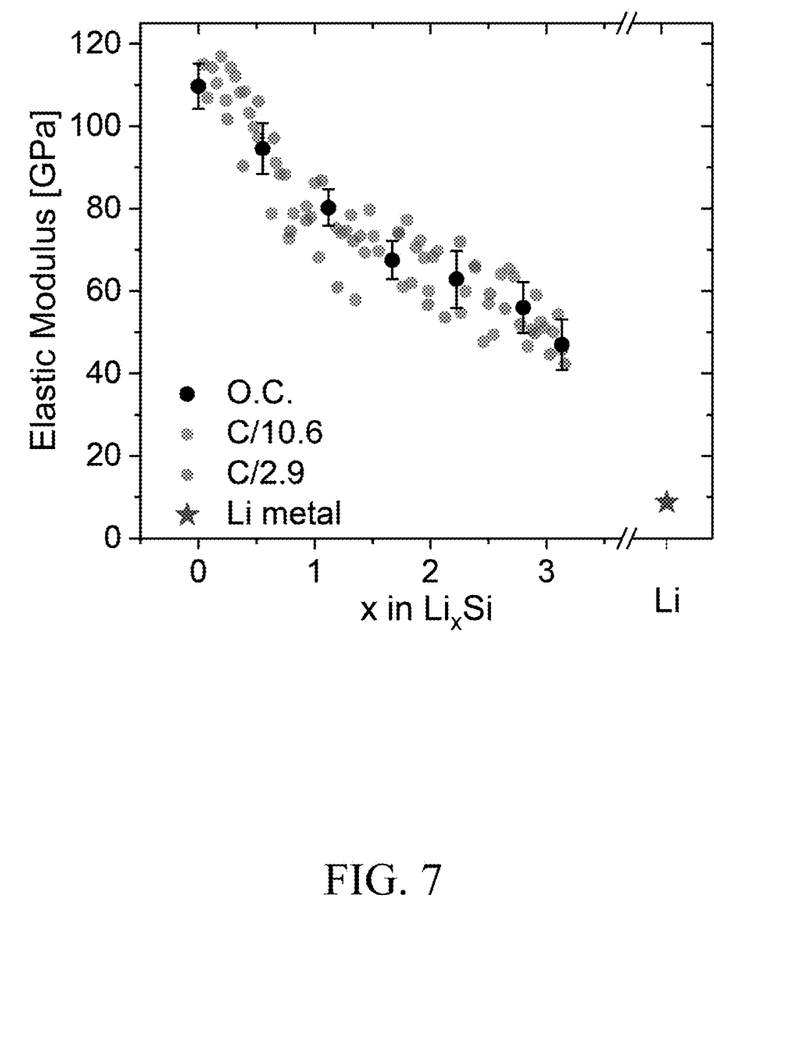
FIGS. 7, 8, and 9 contain plots representing experimental data relating to elastic modulus, hardness, and stress exponent of silicon samples (solid dots) measured as a function of lithium concentration in open circuit (O.C.) and under various charging rates. The samples were tested using an apparatus of the type represented in FIG. 1. Separate measurements performed on pure lithium metal are included (star).
Figure 8:
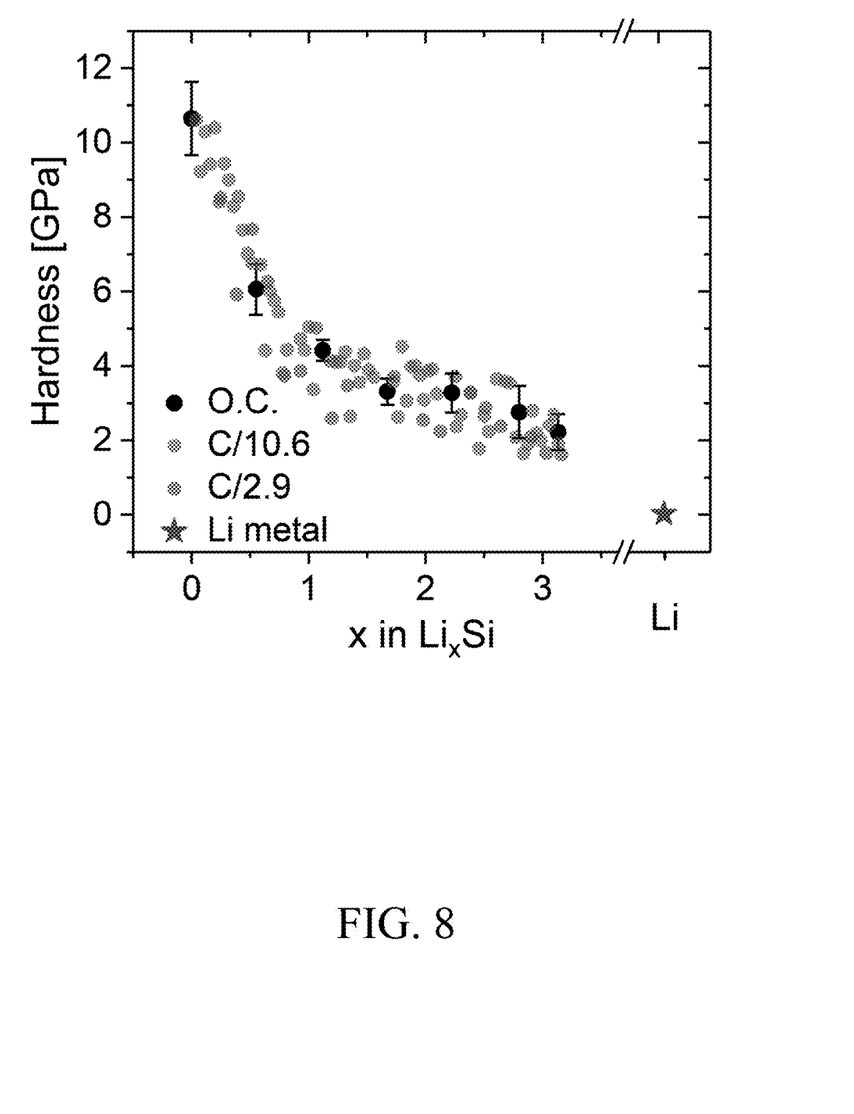
Figure 9:
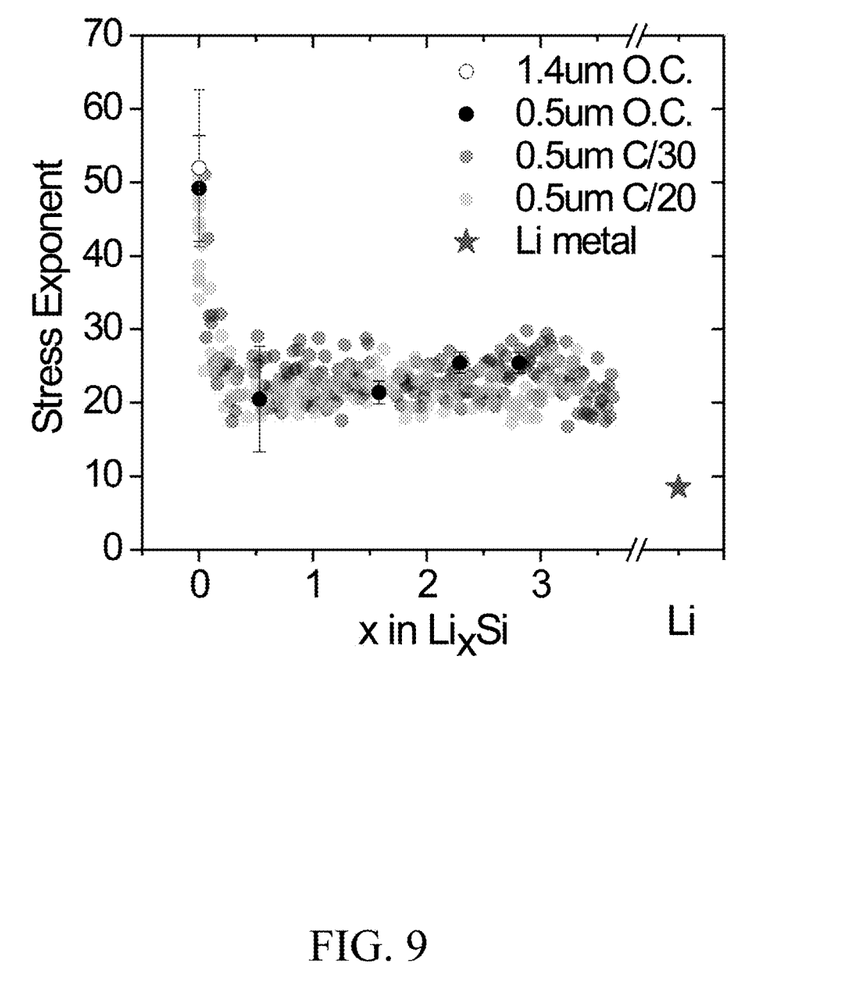
Figure 10:
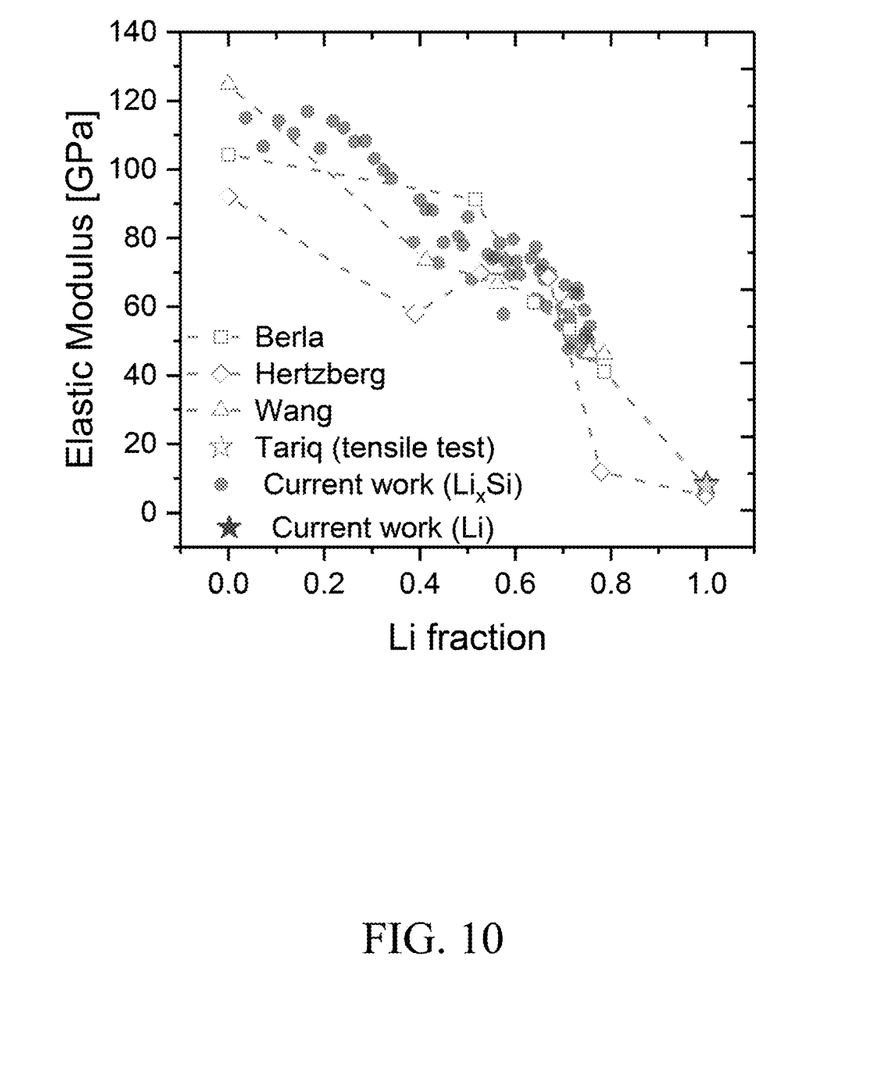
FIGS. 10, 11, and 12 contain plots representing comparisons of the experimental data of FIGS. 7, 8, and 9 compared to literature results published in X. Wang et al., Chem. of Mater., 29, 5831 (2017), B. Hertzberg et al., Electrochem. Commun., 13, 818 (2011), L. A. Berla et al., J. Power Sources, 273, 41 (2015), and S. Tariq et al., In Particle Accelerator Conference, 3, p. 1452, IEEE (2003).
Figure 11:
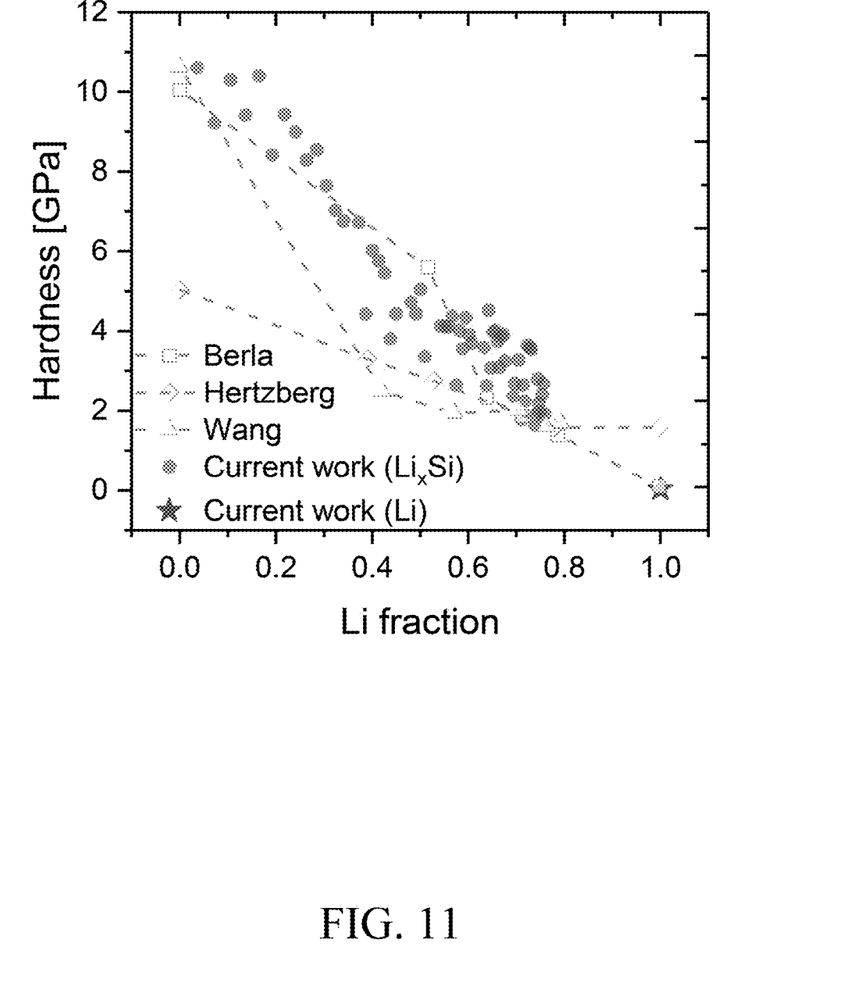
Figure 12:
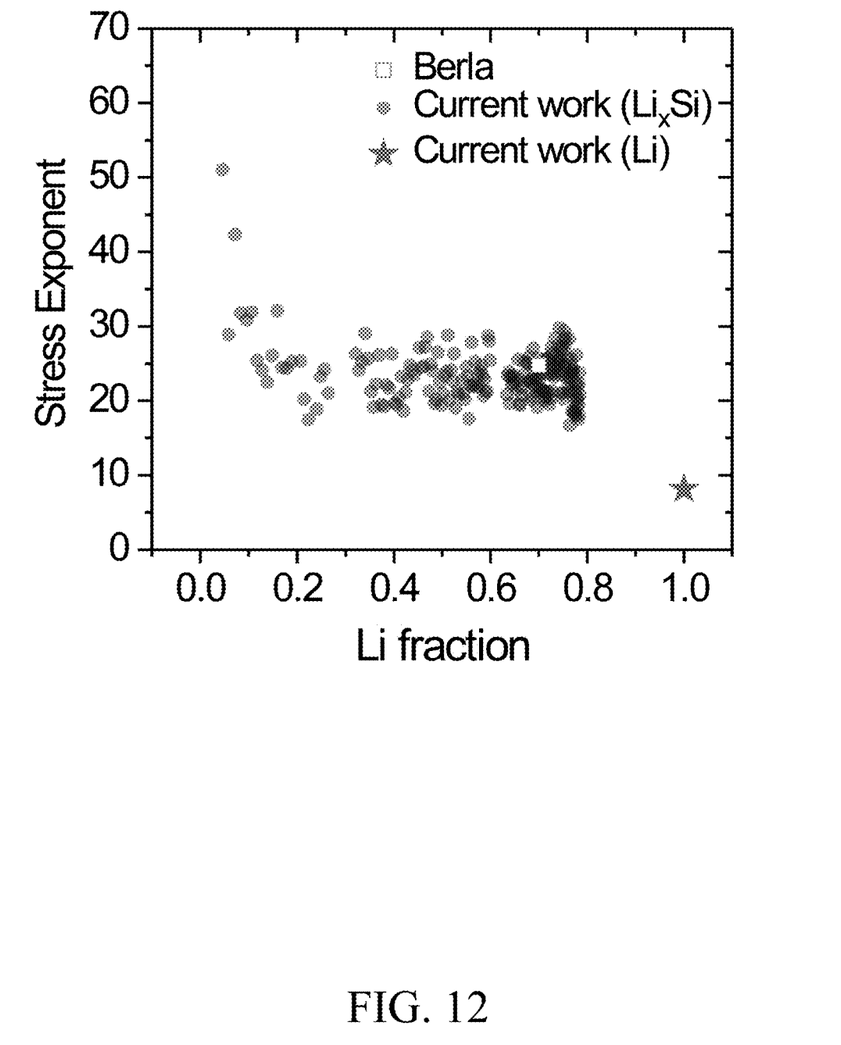

The measured elastic modulus, hardness, and creep stress exponent as a function of lithium concentration are shown in FIGS. 7, 8, and 9, and comparisons with literature data are shown in FIGS. 10, 11, and 12, respectively. Tests performed under the open circuit (O.C.) condition are presented with averages and standard deviations, while the single data points for different charging rates during cell operation represent individual indentations.

The modulus and hardness of pure Li (star in FIGS. 7 and 8) were 8.53 GPa and 28 MPa, respectively. The elastic modulus was close to the uniaxial tensile test result, which was 7.8 GPa. The large standard deviation was possibly caused by the surface roughness of the Li sample, Li creep, and/or material pile-up near the indentation tip. For lithiated Si, the elastic modulus and hardness steadily decreased with Li concentration. The elastic modulus dropped from approximately 110 GPa for pristine Si to 47 GPa for $Li_{3.2}Si$ (52% reduction), while the hardness decreased from 10.6 GPa to 2.2 GPa (78% reduction). These results were well within the range reported by ex-situ measurements, confirming that the SEI layer had a negligible effect on the operando measurements and that the surface quality was sufficient for indentation tests.

The comparisons with literature also clearly showed the advantage of the uninterrupted tests. In ex-situ experiments, multiple samples were charged up to a specific state-of-charge, removed from the cell, and tested using different means to suppress oxidation such as covering the sample with inert oil and providing a continuous flow of inert gas. It appeared that the variation of the experimental procedures may introduce some unnatural transitions in the mechanical properties during lithiation which makes data interpretation difficult. The operando indentation results showed a continuous and smooth decrease of the modulus and hardness of lithiated Si, and the rule of mixture provided a reasonable approximation to capture the dynamic evolution of the mechanical properties.

FIGS. 9 and 12 depict the stress exponent of lithiated Si as a function of the Li composition under different charging rates. The results were obtained from the constant-load hold quasi-static measurements. The stress exponent for pure Si was approximately 50, or equivalently, the strain rate sensitivity was 0.02, with zero meaning that the stress response was insensitive to the strain rate, and one representing Newtonian viscous flow. The comparison between the 0.5 μm (solid black circle) and the 1.4 μm (open circle) thick pristine films indicates that the stress exponent was not significantly influenced by the sample substrate. The creep of lithiated Si behaved like a step function, that is, the stress exponent dramatically decreased upon the start of lithiation and dropped to 22 for $Li_{0.5}Si$. Afterwards, the stress exponent remained nearly constant for the Li composition over $Li_{0.5}$ Si. A prior first-principles modeling demonstrated that the brittle-to-ductile transition occurred in $Li_{0.25}Si$ where a small fraction of Li mediated the flow of lithiated Si. This transition was corroborated by the measurements of the stress exponents. The stress exponent of approximately 22 for lithiated Si was in close agreement with ex-situ nanoindentation measurements reported previously. The Q.S. creep results were compared with the CSM output using the Maier method. The stress exponent of partially lithiated Si was 20.4 for the holding time of 300 s, while the stress exponent of Li metal obtained from the 600 s holding was 8.77.

It was observed that the elastic modulus and hardness of lithiated Si for a given composition measured at different charging rates and under open circuit conditions are nearly identical (FIGS. 7 and 8). A few earlier studies proposed the dependence of the mechanical properties of electrodes on the charging rate. However, the coupling between the mechanical properties and the chemical reaction rate was not apparent in the operando indentation tests. For instance, the hardness, which is typically in a linear relationship with the flow stress, was about the same for the measurements at galvanostatic charging rates of C/2.9 and C/10.6 as well as at open circuit condition. This finding, however, does not exclude the possible coupling between the mechanical behaviors and the reaction rate in electrodes. With the relative slow charging rates, the coupling effects may be convoluted with the variation of the experimental output, or the time scales for the chemical reaction and plastic flow of lithiated Si may be vastly different which makes it difficult to capture by nanoindentation.

It is also worth noting that wafer curvature experiments on Si found that the flow stress increased by 0.1 GPa when the charging rate increased from C/128 to C/2. In wafer curvature experiments, the substrate bends proportionally to the stress developed in the film electrode, which depends on the rate of Li insertion as well as the viscoplastic properties of the electrodes. In nanoindentation, however, the strain rate and the electrochemical charging rate are separate—the strain rate (time derivative of the fitted curve divided by the tip displacement) is provided by the load cell while the charging rate is controlled by the electrochemical station. Thus, operando indentations allow the measurement of modulus and hardness of electrodes independently from their viscous behaviors.

The apparatus 10 described above provides for an operando indentation platform that integrates a nanoindenter, a custom fluid cell, and an electrochemical station in an inert environment. This arrangement enables the measurement of the dynamic chemomechanical response of electrodes in an open configuration during real-time electrochemical reactions. It is believed that the apparatus 10 may be useful for unraveling a variety of phenomena in energy materials involving the intimate interactions between mechanics and electrochemistry, nonlimiting examples including stress-regulated ion diffusion and electron transfer, concurrent processes of plasticity and reaction, corrosive fracture, and mechanical stability of electrodes in the long-term performance of batteries.

While the invention has been described in terms of specific embodiments, it is apparent that other forms could be adopted by one skilled in the art. For example, the physical configuration of the apparatus 10 and its components could differ in appearance and construction from the embodiments described herein and shown in the drawings, functions of certain components could be performed by components of different construction but capable of a similar (though not necessarily equivalent) function, and various materials could be used in the fabrication of the apparatus 10 and its components. As such, it should be understood that the above detailed description is intended to describe the particular embodiments represented in the drawings and certain but not necessarily all features and aspects thereof, and to identify certain but not necessarily all alternatives to the represented embodiments and described features and aspects. As a nonlimiting example, the invention encompasses additional or alternative embodiments in which one or more features or aspects of a particular embodiment could be eliminated or two or more features or aspects of different embodiments could be combined. Accordingly, it should be understood that the invention is not necessarily limited to any embodiment described herein or illustrated in the drawings. It should also be understood that the phraseology and terminology employed above are for the purpose of describing the illustrated embodiment, and do not necessarily serve as limitations to the scope of the invention. Therefore, the scope of the invention is to be limited only by the following claims.

The invention claimed is:

1. An apparatus for performing indentation on an electrode in an electrochemical cell during operation thereof, the apparatus comprising:
   a fixture comprising a fluid reservoir that is open to a surrounding atmosphere, first and second electrodes located within the fluid reservoir, and a contact for coupling with a sample material located in the fluid reservoir to define a third electrode;
   a nanoindenter configured for applying a load to a surface of the sample material to form an indentation therein and measuring the load and size of the indentation over time;
   a housing enclosing the fixture and the nanoindenter within an inert atmosphere; and a potentiostat configured to charge and discharge an electrochemical cell that is defined by the first, second, and third electrodes and an electrolyte solution in the fluid reservoir while the nanoindenter is applying the load.

2. The apparatus of claim 1, further comprising a motion system configured to cause relative movement between the fixture and the nanoindenter such that the nanoindenter is capable of forming indentations at multiple locations in the surface of the sample material.

3. The apparatus of claim 2, further comprising an optical microscope configured to visually observe the surface of the sample material.

4. The apparatus of claim 1, further comprising a motion system configured to cause relative movement between the fixture and the nanoindenter such that the nanoindenter is capable of forming indentations at multiple locations in the surface of the sample material, and cause relative motion between the fixture and an optical microscope configured to visually observe the surface of the sample material.

5. The apparatus of claim 1, wherein the fluid reservoir is defined by a holder configured to hold the sample material and a wall surrounding the holder, and the holder is configured to move toward and away from the nanoindenter while the wall remains in a fixed position.

6. The apparatus of claim 1, wherein the fixture includes an overflow reservoir surrounding the fluid reservoir to receive fluid spilled from the fluid reservoir.

7. The apparatus of claim 1, wherein the fixture includes a separate reservoir for cleaning a tip of the nanoindenter.

8. The apparatus of claim 1, wherein the fixture includes recessed areas coupled to the first and second electrodes and the contact, the recessed areas configured to receive fasteners configured to couple wires from the potentiostat to the first and second electrodes and the contact.

9. The apparatus of claim 1, wherein the inert atmosphere comprises argon.

10. The apparatus of claim 1, further comprising a stage configured to receive and hold the fixture.

11. The apparatus of claim 10, wherein the stage is configured to simultaneously hold multiple additional fixtures identical to the fixture.

12. The apparatus of claim 1, wherein the first and second electrodes are formed of lithium metal or an alloy thereof.

13. The apparatus of claim 1, wherein the first electrode is a reference electrode and the second electrode is a counter electrode that wraps at least partially around the fluid reservoir.

14. A method of performing indentation on an electrode in an electrochemical cell during operation thereof, the method comprising:
locating a sample material in a fluid reservoir of a fixture, the fluid reservoir being defined by a wall and a holder that is surrounded by the wall and configured to move relative to the wall, the fluid reservoir comprising first and second electrodes located therein, the fluid reservoir being open to a surrounding atmosphere;
coupling the sample material to a contact on the fixture to define a third electrode;
moving the holder relative to the wall of the fluid reservoir and toward or away from a nanoindenter while the wall remains in a fixed position;
filling the fluid reservoir with an electrolyte solution to submerge the first, second, and third electrodes; and
simultaneously forming an indentation in a surface of the sample material by applying a load thereto with the nanoindenter, measuring the load and size of the indentation over time, and charging or discharging an electrochemical cell defined by the first, second, and third electrodes and the electrolyte solution;
wherein the fixture and nanoindenter are enclosed within a housing filled with an inert atmosphere.

15. The method of claim 14, further comprising moving the fixture relative to the nanoindenter and operating the nanoindenter to form indentations at multiple locations in the surface of the sample material.

16. The method of claim 14, further comprising observing the surface of the sample material with an optical microscope located within the housing to select a location at which the indentation is to be formed prior to forming the indentation.

17. The method of claim 14, wherein the locating of the sample material in the fluid reservoir comprises locating the sample material on an upper surface of the holder, and the moving of the holder toward or away from the nanoindenter comprises moving the upper surface of the holder while the wall remains in the fixed position.

18. The method of claim 14, wherein the first and second electrodes are formed of lithium metal or an alloy thereof, and the electrolyte solution is $LiPF_6$ in propylene carbonate.

19. The method of claim 14, wherein the sample material is silicon.

20. The method of claim 14, further comprising using a continuous stiffness measurement (CSM) method to determine hardness and modulus measurements of the sample material.

* * * * *